United States Patent
Tanaka

(10) Patent No.: US 10,306,091 B2
(45) Date of Patent: May 28, 2019

(54) IMAGE FORMING APPARATUS AND METHOD OF CONTROLLING A DISPLAY FOR SELECTING A SHEET FEEDING CASSETTE SOURCE

(71) Applicants: KABUSHIKI KAISHA TOSHIBA, Tokyo (JP); TOSHIBA TEC KABUSHIKI KAISHA, Tokyo (JP)

(72) Inventor: Norio Tanaka, Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/024,436

(22) Filed: Jun. 29, 2018

(65) Prior Publication Data

US 2018/0309893 A1   Oct. 25, 2018

Related U.S. Application Data

(63) Continuation of application No. 15/252,117, filed on Aug. 30, 2016, now Pat. No. 10,015,346.

(30) Foreign Application Priority Data

Nov. 24, 2015   (JP) ................................. 2015-228748

(51) Int. Cl.
    *H04N 1/00*   (2006.01)
    *B41J 2/21*   (2006.01)
    (Continued)

(52) U.S. Cl.
    CPC ............ *H04N 1/00925* (2013.01); *B41J 2/21* (2013.01); *B41M 7/0009* (2013.01); *G03G 15/20* (2013.01);
    (Continued)

(58) Field of Classification Search
    None
    See application file for complete search history.

(56) References Cited

U.S. PATENT DOCUMENTS

| 8,469,349 B2 | 6/2013 | Maeda |
| 8,754,915 B2 | 6/2014 | Umetsu |
(Continued)

FOREIGN PATENT DOCUMENTS

| EP | 2369831 A1 | 9/2011 |
| JP | 5760123 B2 | 8/2015 |

OTHER PUBLICATIONS

Extended European Search Report dated Apr. 18, 2017 from counterpart European Patent Application No. 16189305.2, 7 pages.

*Primary Examiner* — Paul F Payer
(74) *Attorney, Agent, or Firm* — Kim & Stewart LLP

(57) ABSTRACT

An image forming apparatus having a plurality of sheet feeding cassettes includes a display device; and a controller circuit including: a display control unit configured to generate information to be displayed on the display device, the information including a sheet feeding cassette selection region and a first recording agent selection region; and a setting unit configured to apply a recording agent setting for each of the sheet feeding cassettes based on a selection made in the first recording agent selection region among at least a decolorable recording agent including a decolorable color material and a non-decolorable recording agent including a non-decolorable color material. The display control unit is further configured to generate for display on the display device a list of the sheet feeding cassettes along with the recording agent setting for each of the sheet feeding cassettes.

16 Claims, 5 Drawing Sheets

(51) Int. Cl.
*B41M 7/00* (2006.01)
*G03G 15/20* (2006.01)

(52) U.S. Cl.
CPC ....... *H04N 1/0048* (2013.01); *H04N 1/00389* (2013.01); *H04N 1/00411* (2013.01); *H04N 1/00413* (2013.01); *H04N 1/00599* (2013.01); *H04N 1/00724* (2013.01); *H04N 1/00795* (2013.01); *H04N 2201/0094* (2013.01)

(56) References Cited

U.S. PATENT DOCUMENTS

| | | |
|---|---|---|
| 8,781,338 B2 | 7/2014 | Yoshida et al. |
| 8,908,236 B1 | 12/2014 | Rudge et al. |
| 9,044,981 B2 | 6/2015 | Imamiya |
| 2012/0026546 A1 | 2/2012 | Miura |
| 2012/0170064 A1 | 7/2012 | Hibino et al. |
| 2013/0063748 A1 | 3/2013 | Mimura |
| 2014/0055546 A1 | 2/2014 | Imamiya |
| 2014/0193169 A1 | 7/2014 | Shinohara |
| 2014/0210930 A1 | 7/2014 | Umetsu |
| 2014/0212160 A1 | 7/2014 | Fukaya |
| 2015/0049352 A1 | 2/2015 | Yagi et al. |

IMAGE FORMING APPARATUS AND METHOD OF CONTROLLING A DISPLAY FOR SELECTING A SHEET FEEDING CASSETTE SOURCE

CROSS-REFERENCE TO RELATED APPLICATION

This application is a continuation of U.S. patent application Ser. No. 15/252,117, filed Aug. 30, 2016, which application is based upon and claims the benefit of priority from Japanese Patent Application No. 2015-228748, filed Nov. 24, 2015, the entire contents of which are incorporated herein by reference.

FIELD

Embodiments described herein relate generally to an image forming apparatus.

BACKGROUND

Generally, a sheet printed with recording agent including decolorable color material (hereinafter, referred to as "decolorable recording agent") is recycled by decoloring. The sheet printed with decolorable recording agent can be recycled a plurality of times by decoloring, but printing quality deteriorates with repeated recycling. Users who are unaware that a sheet feeding cassette contains recycled sheets may print confidential documents or public documents on recycled sheets. This problem is common to all cases of printing not only the confidential documents and the public documents but also a document which is not intended to be recycled.

DETAILED DESCRIPTION

According to embodiments, there is provided an image forming apparatus which can prevent printing of a document that is not intended to be recycled on a recycled sheet.

In general, according to one embodiment, an image forming apparatus having a plurality of sheet feeding cassettes includes a display device; and a controller circuit including: a display control unit configured to generate information to be displayed on the display device, the information including a sheet feeding cassette selection region and a first recording agent selection region; and a setting unit configured to apply a recording agent setting for each of the sheet feeding cassettes based on a selection made in the first recording agent selection region among at least a decolorable recording agent including a decolorable color material and a non-decolorable recording agent including a non-decolorable color material. The display control unit is further configured to generate for display on the display device a list of the sheet feeding cassettes along with the recording agent setting for each of the sheet feeding cassettes.

Hereinafter, an embodiment of an image forming apparatus will be described with reference to the drawings.

Figure 1:
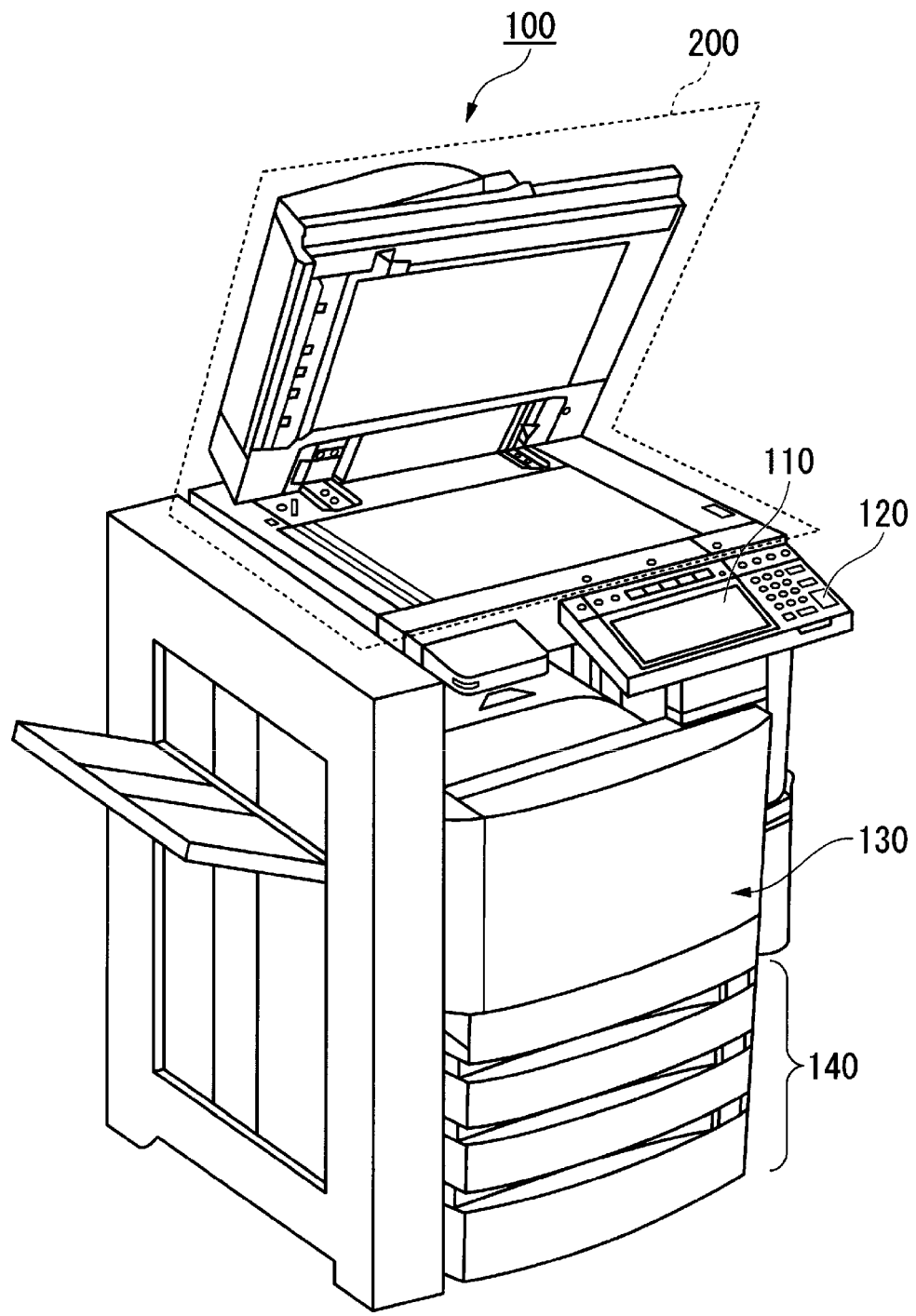
FIG. 1 is an outside view illustrating an example of entire configuration of an image forming apparatus according to an embodiment.

FIG. 1 is an outside view of an image forming apparatus 100 according to an embodiment.

The image forming apparatus 100 is a multi-function peripheral (MFP) capable of forming a toner image on a sheet. The sheet is, for example, a manuscript or a paper in which a character or an image is described. The sheet may be any material as long as the image forming apparatus 100 can process the sheet. The image forming apparatus 100 generates digital data by reading the image that appears on a sheet, to generate an image file.

The image forming apparatus 100 includes the display 110, a control panel 120, a printer unit 130, a sheet accommodation unit 140, and an image reading unit 200. The printer unit 130 may be a device for fixing an image using a toner, or may be an ink jet device. In either case, the printer unit uses a recording agent, toner or ink, to put the image on the sheet. In the embodiment, the printer unit 130 will be described using the toner device as an example.

The display 110 is an image display device such as a crystal display and an organic electro luminescence (EL) display. The display 110 displays various information on the image forming apparatus 100. For example, the display 110 displays information such as information on each sheet feeding cassette, information on toner used for printing and information on printing mode. The display 110 outputs icons received input by a user and a signal in accordance with an operation performed by the user to the control unit of the image forming apparatus 100.

The control panel 120 includes a plurality of buttons. The control panel 120 receives an operation of the user. The control panel 120 outputs the signal in accordance with the operation performed by the user to the control unit of the image forming apparatus 100. The display 110 and the control panel 120 may be configured as an integral touch panel.

The printer unit 130 executes image formation processing. The printer unit 130 forms the image on the sheet, based on the image information generated by the image reading unit 200 or the image information received via a communication path in the image forming processing.

The sheet accommodation unit 140 includes a plurality of sheet feeding cassettes. Each sheet feeding cassette can be assigned a set of approved toners for printing. Specifically, for each sheet feeding cassette, printing by decolorable toner, printing by non-decolorable toner, and printing by both the decolorable toner and the non-decolorable toner can be approved and assigned. The decolorable toner is the toner of the decolorable recording agent. The non-decolorable toner is the toner of the recording agent that cannot be decolored. Herein, decoloring means to cause the image formed with a color different from that of the base sheet (not only a chromatic color, but also including an achromatic color such as white and black) to be visually invisible. The decoloring for the image formed on the sheet may be performed in a manner other than by heating. The toner approval setting is performed by operating the display 110 or a printer driver by the user. The phrase "the toner approval setting" means that controller 300 assigns the approved toners for printing to each sheet feeding cassette. The approval and changing operations may be performed by a user operating an external apparatus such as a personal computer. Operation of the display 110 to perform toner approval setting of sheet feeding cassettes will now be described as an example.

The image reading unit 200 reads the image information to be read as a brightness and darkness of light. The image reading unit 200 records the image information. The recorded image information may be transmitted to another information processing apparatus via a network. The recorded image information may be the image formed on the sheet by the printer unit 130.

Figure 2:
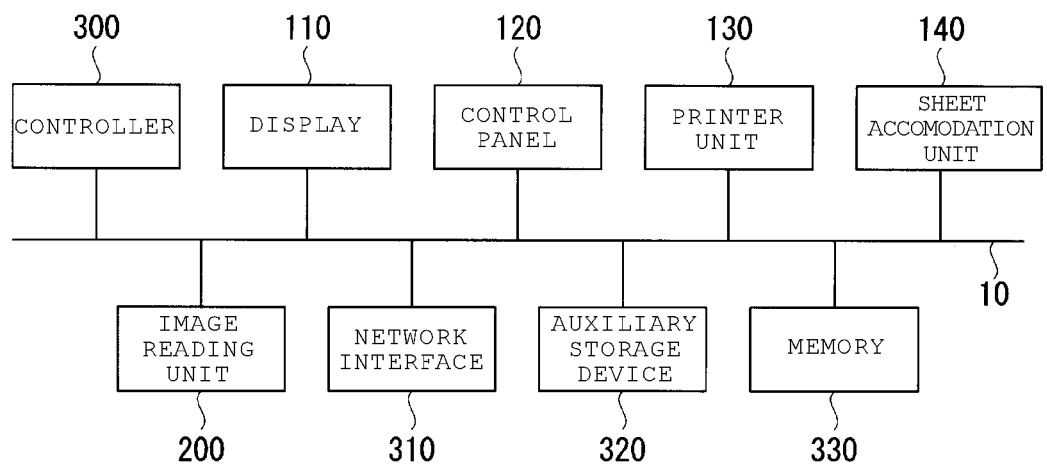
FIG. 2 is a block diagram illustrating a functional configuration of the image forming apparatus.

FIG. 2 is a block diagram illustrating a functional configuration of the image forming apparatus 100.

Hereinafter, a controller 300, a network interface 310, an auxiliary storage device 320, and a memory 330 will be described. The description for the display 110, the control panel 120, the printer unit 130, the sheet accommodation unit 140, and the image reading unit 200 will be omitted. Each functional unit is connected to a system bus 10 for data communication.

The controller 300 controls the operation of each functional unit of the image forming apparatus 100. The controller 300 executes various processing by executing a program. The controller 300 acquires an instruction input by the user from the display 110. The controller 300 executes the control processing based on the acquired instruction. For example, the controller 300 applies the setting of each sheet feeding cassette of the sheet accommodation unit 140. For example, the controller 300 controls a display aspect of the display 110 according to the toner selected by the user for printing. Hereinafter, the toner information selected by the user for printing will be referred to as a selection toner. Specifically, the controller 300 displays the sheet feeding cassette in which the selection toner is not approved for use in printing (hereinafter, referred to as "non-approval cassette") in the display aspect different from the other sheet feeding cassettes. The phrase "the selection toner is not approved for use in printing" means that no toner approved for the sheet feeding cassette matches the selection toner. A "non-approval cassette" is a sheet feeding cassette none of whose approved toners matches the selection toner. For example, the controller 300 displays the non-approval cassette so that the user cannot select the non-approval cassette among the sheet feeding cassettes displayed on the display 110. The non-approval cassette may be displayed, for example, using a gray scale, or may not be displayed at all on the display 110.

The network interface 310 communicates data with another apparatus. The network interface 310 operates as an input interface, and receives the data transmitted from another apparatus. The network interface 310 operates as an output interface, and transmits the data to another apparatus.

The auxiliary storage device 320 is, for example, a hard disk or a solid state drive (SSD), and stores various data. Various data are, for example, such as digital data, screen data of a setting screen, setting information, a job, and a job log. The digital data is generated by the image reading unit 200. The setting screen is the screen for the toner approval setting. The phrase "the toner approval setting" refers to the information that the controller uses to assign toners to each cassette as usable for printing, as selected by the user.

The memory 330 is, for example, a random access memory (RAM). The memory 330 temporarily stores the data that each functional unit which the image forming apparatus 100 is provided, uses. The memory 330 may store the digital data generated by the image reading unit 200. The memory 330 may temporarily store the job and the job log.

Figure 3:
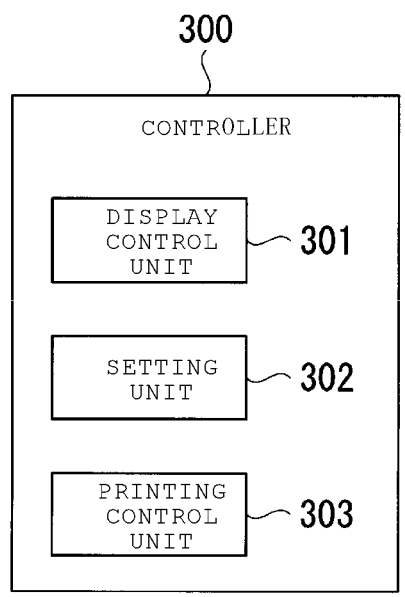
FIG. 3 is a block diagram illustrating a functional configuration of a controller.

FIG. 3 is a block diagram illustrating the functional configuration of the controller 300.

As illustrated in FIG. 3, the controller 300 includes a display control unit 301, a setting unit 302, and a printing control unit 303.

The display control unit 301 controls the display of the display 110. For example, the display control unit 301 displays the setting screen on the display 110 according to the user's operation. For example, the display control unit 301, based on the setting information stored in the auxiliary storage device 320, displays the non-approval cassette information in the display aspect different from the other sheet feeding cassette information.

The setting unit 302, based on the contents set by the user in the setting screen, performs the setting of each sheet feeding cassette. The setting unit 302 causes the auxiliary storage device 320 to store the setting information.

The printing control unit 303 controls the printer unit 130 to execute the printing when the instruction for printing is performed.

Operation of the image forming apparatus 100 in setting toner approvals, and thereafter, will now be described with reference to FIGS. 4 to 7.

Figure 4:
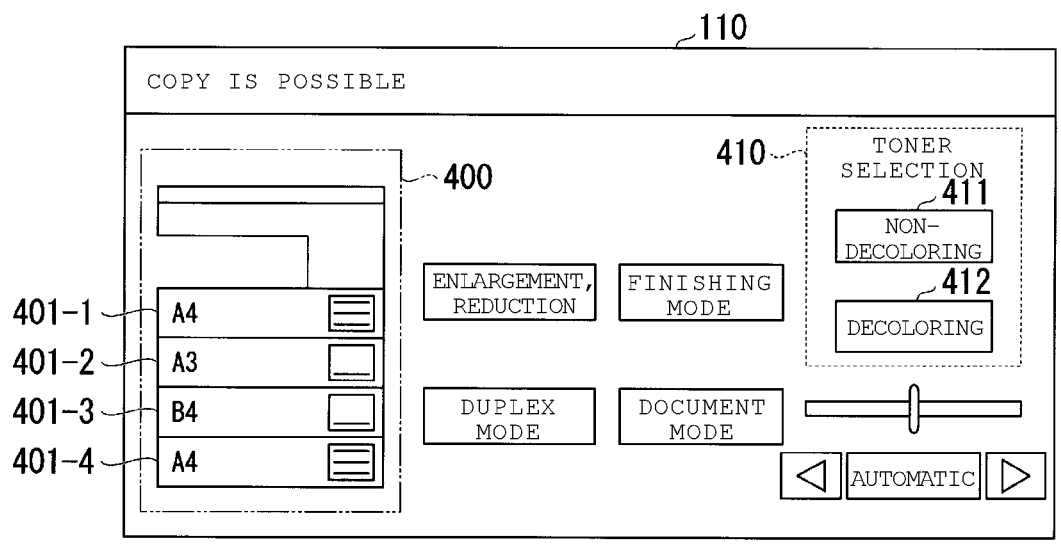
FIG. 4 is a diagram illustrating an example of a screen of a display when a toner approval setting is not performed.

FIG. 4 is a diagram illustrating an example of the screen of the display 110 when no toners are approved for use in printing. As illustrated in FIG. 4, a sheet feeding cassette information region 400 and information indicated in a toner selection region 410 are displayed on the screen of the display 110.

The information on the sheet feeding cassette is displayed in the sheet feeding cassette information region 400. For example, the information on an accommodated sheet size, the number of sheets, and the toner in which approval setting is performed for each sheet feeding cassette is displayed on the sheet feeding cassette information region 400. In the example illustrated in FIG. 4, information on four sheet feeding cassettes 401-1 to 401-4 is displayed in the sheet feeding cassette information region 400. In the example illustrated in FIG. 4, toner information is not displayed for any of the sheet feeding cassettes 401-1 to 401-4 in the sheet feeding cassette information region 400, because no toners are approved for printing. As illustrated in FIG. 4, when the toner information is not displayed, both the erasable toner and the non-erasable toner maybe assigned to a sheet feeding cassette for printing.

A plurality of icons for selecting the toner to be used for printing are displayed on the toner selection region 410. The icons displayed on the toner selection region 410 are a non-decoloring icon 411, and a decoloring icon 412. The non-decoloring icon 411 is selected when using the non-decolorable toner for printing. The decoloring icon 412 is selected when using the decolorable toner for printing.

Information other than the above-described information may also be displayed on the screen of the display 110, but description of the other information will be omitted for the sake of simplicity. The setting icon for displaying the setting screen may be displayed on the screen of the display 110.

Figure 5:
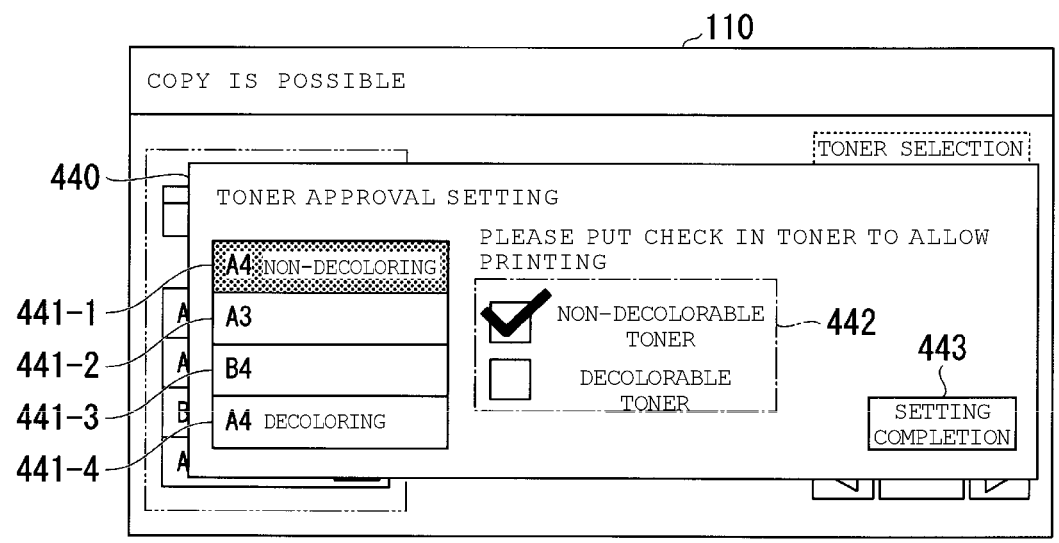
FIG. 5 is a diagram illustrating an example of the setting screen.

When the setting icon is selected by the user, the display control unit 301 superimposes the setting screen on the screen illustrated in FIG. 4. FIG. 5 is a diagram illustrating an example of the setting screen. As illustrated in FIG. 5, a selection icon 441-1 to 441-4 of the sheet feeding cassette, an approval toner selection region 442, and a setting completion icon 443 are displayed on the setting screen 440. The selection icon 441-1 corresponds to the sheet feeding cassette 401-1. Similarly, the other selection icons 441-2 to 441-4 correspond respectively to sheet feeding cassettes 401-2 to 401-4. The user approves toners for use with a sheet feeding cassette by selecting one of the selection icons 441-1 to 441-4. In other words, toner information can be set for the selected sheet feeding cassette. Selection of the selection icon 441-1 is illustrated in FIG. 5. The toners to approve are displayed in the approval toner selection region 442. The setting completion icon 443 is selected when the toner approval setting is completed. With reference to FIG. 5, the flow of the toner approval setting will be described.

Figure 6:
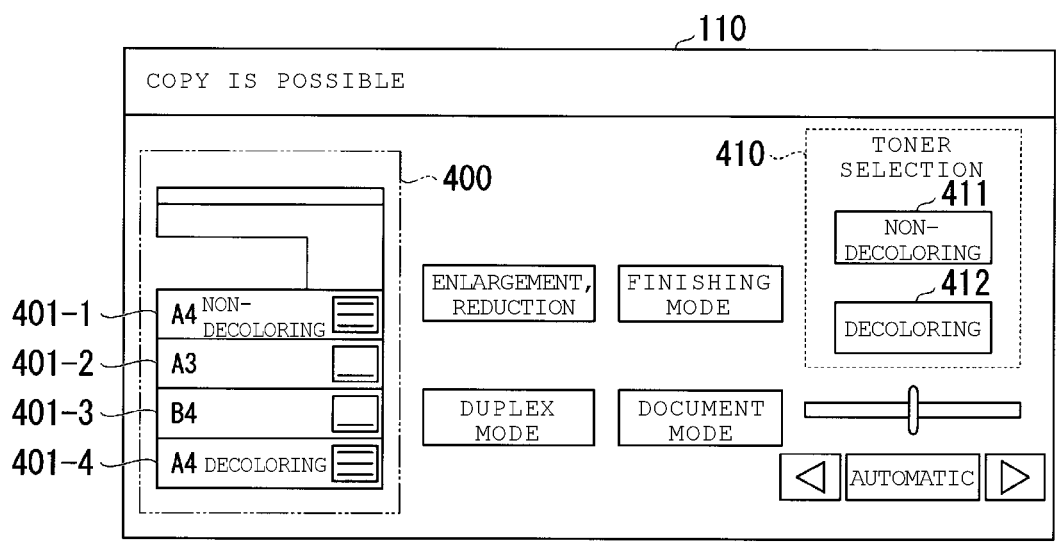
FIG. 6 is a diagram illustrating example of the screen of the display after the toner approval setting is completed.

First, the user selects the selection icon corresponding to the sheet feeding cassette for which a toner is to be approved. In FIG. 5, the sheet feeding cassette selection icon 441-1 is shown selected. The user then selects one or more toners displayed in the approval setting toner selection region 442 to allow for use in printing. Herein, the non-decolorable toner is selected to approve the non-decolorable toner for use with the sheet feeding cassette 401-1. The approved toners are displayed on the selection icon of the sheet feeding cassette (FIG. 6). In the example illustrated in FIG. 5, a toner approval setting of the sheet feeding cassette 401-4 is also shown. When the user selects the setting completion icon 443, the toner approval setting is completed. In this case, the setting unit 302 causes the auxiliary storage device 320 to store the settings.

FIG. 6 is a diagram illustrating an example of the screen of the display 110 after the toner approval setting is completed. In the example illustrated in FIG. 6, the toner information in which the approval setting is performed is displayed on the sheet feeding cassettes 401-1 to 401-4 of the sheet feeding cassette information region 400. For example, the display of "non-decoloring" with the sheet feeding cassette 401-1 means that printing using only the non-decolorable toner is approved for cassette 401-1. No approved toners are shown for sheet feeding cassettes 401-2 and 401-3, meaning that printing by the decolorable toner and the non-decolorable toner is available. The display of "decoloring" with the sheet feeding cassette 401-4 means that printing using only the decolorable toner is approved for cassette 401-4. Printing following the toner settings illustrated in FIG. 6 will now be described with reference to FIG. 7.

Figure 7:
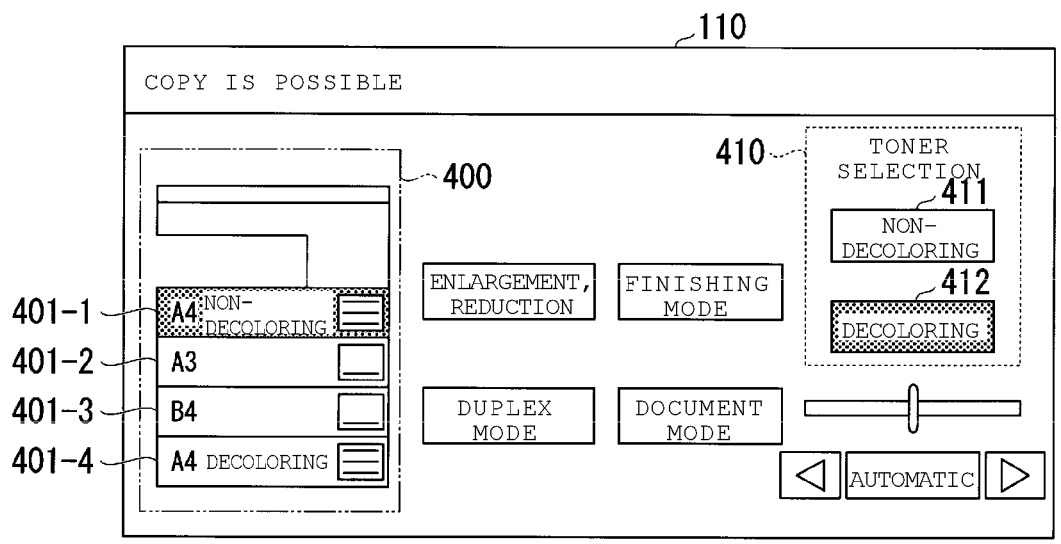
FIG. 7 is a diagram illustrating example of the screen of the display in printing after the toner approval setting is completed.

FIG. 7 is a diagram illustrating example of the screen of the display 110 during printing after the toner approval setting is completed. Printing with the decolorable toner is illustrated.

When the user selects printing with the decolorable toner, the display control unit 301 performs the following processing. The display control unit 301 determines whether or not any non-approval cassette is present among the sheet feeding cassettes 401-1 to 401-4 in which printing with the decolorable toner is not allowed. In the example in FIG. 7, the sheet feeding cassette 401-1 is a non-approval cassette for the decolorable toner. Because the sheet feeding cassettes 401-1 is set for only non-decolorable toner, the toner information of the sheet feeding cassette 401-1 does not match the toner information selected by the user. In this case, the display control unit 301 displays the information of the sheet feeding cassette 401-1 in the display aspect different from the information of another sheet feeding cassettes 401-2 to 401-4. The display control unit 301 thus causes the user to recognize that the sheet feeding cassette 401-1 cannot be selected.

Similarly as described above, when printing with the non-decolorable toner by the user is selected, the display control unit 301 performs the following processing. The display control unit 301 determines whether or not any non-approval cassette is present among the sheet feeding cassettes 401-1 to 401-4 in which printing with the non-decolorable toner is not allowed. In FIG. 7, the sheet feeding cassette 401-4 is a non-approval cassette for the non-decolorable toner. In this case, the display control unit 301 displays the information of the sheet feeding cassette 401-4 in the display aspect different from the information of the other sheet feeding cassettes 401-1 to 401-3.

Figure 8:
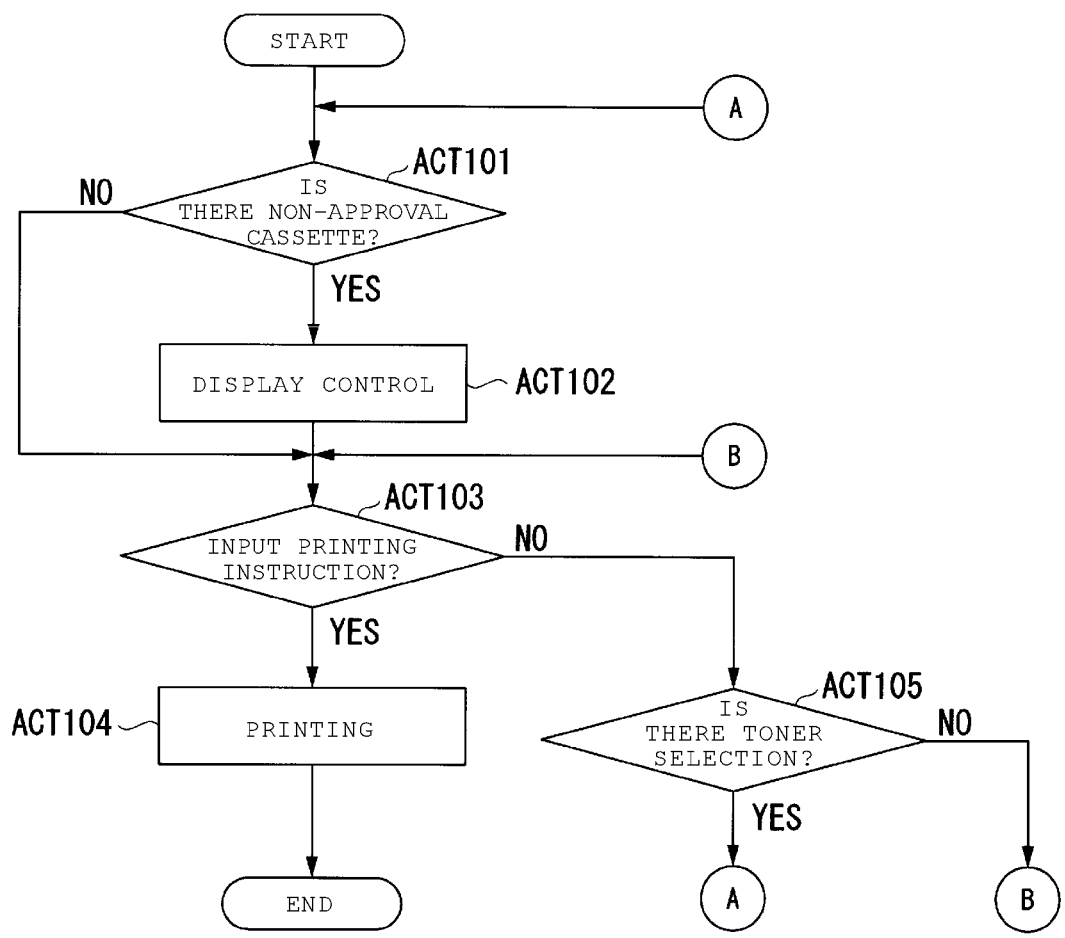
FIG. 8 is a flowchart illustrating a flow of processing of the image forming apparatus.

FIG. 8 is a flowchart illustrating a flow of processing of the image forming apparatus 100. The processing in FIG. 8 is performed after the user selects the toner.

The display control unit 301 determines whether or not any non-approval cassette is present based on the toner selected by the user in the toner section region 410 (ACT101). When there is a non-approval cassette (ACT101: YES), the display control unit 301 controls the screen display of the display 110 (ACT102). Specifically, the display control unit 301 displays the non-approval cassette in a way that cannot be selected by the user. Thereafter, the printing control unit 303 determines whether or not a printing instruction is input (ACT103). When the printing instruction is input (ACT103: YES), the printing control unit 303 controls the printer unit 130 to execute the printing (ACT104). At this time, the printing control unit 303 controls the printer unit 130 so as to print with the toner selected by the user.

When the printing instruction is not input (ACT103: NO), the display control unit 301 determines whether or not the toner is selected (ACT105). When the toner is selected (ACT105: YES), the image forming apparatus 100 executes the processing subsequent to ACT101.

When the toner is not selected (ACT105: NO), the image forming apparatus 100 executes the processing subsequent to ACT103.

When there is no non-approval cassette (ACT101: NO), the image forming apparatus 100 executes the processing subsequent to ACT103 in the processing of ACT101.

According to the image forming apparatus 100 configured as above, it is possible, for example, to prevent unintended printing on a recycled sheet by mistake. Hereinafter, this effect will be described in detail.

The image forming apparatus 100 sets the toner to allow as the toner to be used for printing for each sheet feeding cassette according to the user's settings. For example, when the user performs the setting of allowing the sheet feeding cassette accommodating the recycled sheet to print only with the decolorable toner, the image forming apparatus 100 performs the above setting. The image forming apparatus 100 limits the sheet feeding cassettes which the user can select, based on the setting contents and the toner selected in printing by the user. Thus, when the user prints with the non-decolorable toner, the sheet feeding cassette with recycled sheet for printing only with the decolorable toner cannot be selected. Accordingly, when the user prints with the non-decolorable toner, printing on the recycled sheet is not available. For this reason, it is possible to prevent printing a document not intended to recycle on the recycled sheet by mistake.

When the user prints with the decolorable toner, the sheet feeding cassette with recycled sheets for printing only with the decolorable toner can be selected. Accordingly, the image forming apparatus 100 can again print on the recycled sheet with the decolorable toner. For this reason, it is possible to increase the reusability of the recycled sheet.

The display control unit 301 performs the display that allows confirmation of the toner approvals settings for each sheet feeding cassette. Specifically, the display control unit 301 displays the allowed toner information for each sheet feeding cassette. Accordingly, the user can recognize which sheet feeding cassette allows which toner just by looking at the display 110 screen. For this reason, it is possible to prevent printing using unintended pairings of sheets and toners by mistake.

Typically, only specific users such as an administrator of the image forming apparatus 100 may set or change toner approvals for sheet feeding cassettes.

Hereinafter, a modification example of the image forming apparatus 100 will be described.

The information display of the toner approval setting of the sheet feeding cassette need not be limited to the display of the sheet feeding cassette information region 400 illustrated in FIGS. 4 to 8. For example, the information display of the toner approval setting of the sheet feeding cassette may be a drawing or such as an icon.

In this embodiment, the setting unit 302 performs the toner approval setting of the sheet feeding cassette, but it is not limited thereto. For example, the setting unit 302 may apply a setting that prohibits use of a toner with a sheet feeding cassette. In other words, the controller may assign an unusable toner for printing to each sheet feeding cassette. In this case, the display control unit 301 controls the display so that the toner selected as the toner used for printing by the user, cannot select the sheet feeding cassette of the prohibition setting.

The image forming apparatus 100 may perform the toner approval setting of the sheet feeding cassette for each user to authenticate the user. In the case of this configuration, the auxiliary storage device 320 stores the information on the toner approval setting of the sheet feeding cassette for each user. The display control unit 301 performs the display according to the toner approval setting set by the authenticated user with respect to the user who is authenticated.

In the embodiment, the display control unit 301 displays the non-approval cassette information in the display aspect different from other sheet feeding cassettes, but other displays may be performed. For example, a popup display can allow the user to confirm settings. In this configuration, the display control unit 301 displays all sheet feeding cassettes, including non-approval cassettes, as sheet feeding sources for printing by the user. The display control unit 301 shows the non-approval cassette as selected and an icon for selecting whether or not to print using the selected cassette appears in the pop-up display for the user. When the user selects the icon to print, the printing control unit 303 controls to print on the sheet supplied from the non-approval cassette. When the user selects the icon indicating the effect without requiring the printing, the display control unit 301 displays the screen for selecting again (for example, the screen in FIG. 6).

According to at least one of the above-described embodiments, by operation of the setting unit 302 that assigns any of the decolorable toner and the non-decolorable toner for each sheet feeding cassette, and the display control unit 301 that controls the display so that the sheet feeding cassette satisfying a predetermined condition cannot be selected as a sheet feeding source, it is possible to prevent printing a document that is not intended to be recycled on a recycled sheet by mistake.

Some functions of the image forming apparatus 100 in the above-described embodiment may be achieved by a computer. In this case, a program for achieving the functions is recorded in a computer-readable recording medium. It may be achieved by installing the program recorded in the recording medium recorded the above-described program into a computer system to execute. The "computer system" referred to herein includes a hardware such as an operating system or peripherals. The "computer-readable recording medium" refers to such as a portable medium or a storage device. The portable medium is a flexible disk, a magneto-optical disk, a ROM, a CD-ROM or the like. The storage device is a hard disk incorporated in the computer system.

Furthermore, the "computer-readable recording medium" dynamically holds a program in a short period of time, as a communication line in a case of transmitting the program via the communication line. The communication line is a network such as the Internet and a telephone line. The "computer-readable recording medium" maybe a volatile memory in a computer system serving as a server or a client. The volatile memory holds the program for a fixed period of time. The above-described program may achieve some of the above functions. The above-described program may be achieved in combination with the program already recorded the above functions in a computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. An image forming apparatus having a plurality of sheet feeding cassettes, comprising:
   a display device; and
   a controller circuit including:
      a display control unit configured to generate information to be displayed on the display device, the information including a sheet feeding cassette selection region and a first recording agent selection region; and
      a setting unit configured to apply a recording agent setting for each of the sheet feeding cassettes based on a selection made in the first recording agent selection region among at least a decolorable recording agent including a decolorable color material and a non-decolorable recording agent including a non-decolorable color material, wherein
   the display control unit is further configured to further generate for display on the display device a list of the sheet feeding cassettes along with the recording agent setting for each of the sheet feeding cassettes.

2. The image forming apparatus according to claim 1, wherein
   each of the sheet feeding cassettes to which the recording agent setting is applied, stores at least one sheet of printing paper.

3. The image forming apparatus according to claim 1, wherein the information generated by the display control unit further includes a second recording agent selection region for a user, and a sheet feeding cassette is displayed in a different manner relative to other sheet feeding cassettes where a recording agent selected in the second recording agent selection region is different from the recording agent selected in the first recording agent selection region for the sheet feeding cassette.

4. The image forming apparatus according to claim 3, wherein
the recording agent setting for a sheet feeding cassette specifies a recording agent, including the decolorable recording agent and the non-decolorable recording agent, that is allowed for the sheet feeding cassette.

5. The image forming apparatus according to claim 4, wherein
the display control unit is configured to determine for each of the sheet feeding cassettes whether the recording agent selected in the second recording agent selection region is allowed, and a sheet feeding cassette is displayed in a different manner relative to other sheet feeding cassettes where a recording agent selected in the second recording agent selection region is different from the recording agent selected in the first recording agent selection region for the sheet feeding cassette.

6. The image forming apparatus according to claim 1, wherein
the information includes a second recording agent selection region for a user, and a sheet feeding cassette is displayed in a different manner relative to other sheet feeding cassettes where a recording agent selected in the second recording agent selection region is the recording agent selected in the first recording agent selection region for the sheet feeding cassette.

7. The image forming apparatus according to claim 6, wherein
the setting unit is configured to apply a prohibited recording agent setting for each of the sheet feeding cassettes to specify a recording agent including the decolorable recording agent and the non-decolorable recording agent that is prohibited therefor.

8. The image forming apparatus according to claim 7, wherein
the display control unit is configured to determine whether the recording agent selected in the second recording agent selection region is the recording agent prohibited for each of the sheet feeding cassettes, and a sheet feeding cassette is displayed in a different manner relative to other sheet feeding cassettes where the recording agent selected in the second recording agent selection region is the recording agent prohibited for the sheet feeding cassette.

9. A method performed by an image forming apparatus having a plurality of sheet feeding cassettes, the method comprising:

generating information to be displayed on a display device, the information including a sheet feeding cassette selection region and a first recording agent selection region;

applying a recording agent setting for each of the sheet feeding cassettes based on a selection made in the first recording agent selection region among at least a decolorable recording agent including a decolorable color material and a non-decolorable recording agent including a non-decolorable color material; and generating for display on the display device a list of the sheet feeding cassettes along with the recording agent setting for each of the sheet feeding cassettes.

10. The method according to claim 9, wherein
each of the sheet feeding cassettes to which the recording agent setting is applied, stores at least one sheet of printing paper.

11. The method according to claim 9, wherein
the generated information further includes a second recording agent selection region for a user, and a sheet feeding cassette is displayed in a different manner relative to other sheet feeding cassettes where a recording agent selected in the second recording agent selection region is different from the recording agent selected in the first recording agent selection region for the sheet feeding cassette.

12. The method according to claim 11, wherein
the recording agent setting for a sheet feeding cassette specifies a recording agent, including the decolorable recording agent and the non-decolorable recording agent, that is allowed for the sheet feeding cassette.

13. The method according to claim 12, further comprising
determining for each of the sheet feeding cassettes whether the recording agent selected in the second recording agent selection region is allowed, wherein
a sheet feeding cassette is displayed in a different manner relative to other sheet feeding cassettes where a recording agent selected in the second recording agent selection region is different from the recording agent selected in the first recording agent selection region for the sheet feeding cassette.

14. The method according to claim 9, wherein
the information includes a second recording agent selection region for a user, and a sheet feeding cassette is displayed in a different manner relative to other sheet feeding cassettes where a recording agent selected in the second recording agent selection region is the recording agent selected in the first recording agent selection region for the sheet feeding cassette.

15. The method according to claim 14, further comprising
applying a prohibited recording agent setting for each of the sheet feeding cassettes to specify a recording agent including the decolorable recording agent and the non-decolorable recording agent that is prohibited therefor.

16. The method according to claim 15, further comprising
determining whether the recording agent selected in the second recording agent selection region is the recording agent prohibited for each of the sheet feeding cassettes, wherein
a sheet feeding cassette is displayed in a different manner relative to other sheet feeding cassettes where the recording agent selected in the second recording agent selection region is the recording agent prohibited for the sheet feeding cassette.

* * * * *